(12) United States Patent
Martin et al.

(10) Patent No.: US 10,119,637 B2
(45) Date of Patent: Nov. 6, 2018

(54) ASSEMBLY FOR PRODUCING A THREADED CONNECTION FOR DRILLING AND OPERATING HYDROCARBON WELLS, AND RESULTING THREADED CONNECTION

(71) Applicants: VALLOUREC OIL AND GAS FRANCE, Aulnoye-Aymeries (FR); NIPPON STEEL & SUMITOMO METAL CORPORATION, Chiyoda-ku (JP)

(72) Inventors: Pierre Martin, Marly (FR); Guillaume Porquer, Valenciennes (FR)

(73) Assignees: VALLOUREC OIL AND GAS FRANCE, Aulnoye-Aymeries (FR); NIPPON STEEL & SUMITOMO METAL CORPORATION, Chiyoda-ku (JP)

( * ) Notice: Subject to any disclaimer, the term of this patent is extended or adjusted under 35 U.S.C. 154(b) by 182 days.

(21) Appl. No.: 15/102,695

(22) PCT Filed: Dec. 5, 2014

(86) PCT No.: PCT/EP2014/076765
§ 371 (c)(1),
(2) Date: Jun. 8, 2016

(87) PCT Pub. No.: WO2015/086466
PCT Pub. Date: Jun. 18, 2015

(65) Prior Publication Data
US 2016/0312931 A1      Oct. 27, 2016

(30) Foreign Application Priority Data
Dec. 10, 2013   (FR) ..................... 13 62379

(51) Int. Cl.
F16L 25/00    (2006.01)
F16L 15/06    (2006.01)
(Continued)

(52) U.S. Cl.
CPC ............ F16L 15/06 (2013.01); E21B 17/042 (2013.01); E21B 17/0423 (2013.01); F16L 15/001 (2013.01); F16L 2201/40 (2013.01)

(58) Field of Classification Search
CPC ....... F16L 15/002; F16L 15/06; F16L 15/001; F16L 15/004
(Continued)

(56) References Cited

U.S. PATENT DOCUMENTS 3,109,672 A    11/1963  Franz
4,610,467 A     9/1986  Reimert
(Continued)

FOREIGN PATENT DOCUMENTS

CN    1030285 A     1/1989
CN    2351541 Y    12/1999
(Continued)

OTHER PUBLICATIONS

International Search Report dated Jan. 30, 2015, in PCT/EP2014/076765 Filed Dec. 5, 2014.

*Primary Examiner* — Aaron M Dunwoody
(74) *Attorney, Agent, or Firm* — Oblon, McClelland, Maier & Neustadt, L.L.P.

(57) ABSTRACT

An assembly for producing a threaded connection, including tubular components provided with continuous threaded zones, in the form of helixes each provided with a first and a second taper generatrix, each of the threaded zones defining a thread profile, viewed in a longitudinal section passing through the axis of revolution, provided with load flanks, stabbing flanks, thread crests, and thread roots, wherein the (Continued)

height of the threads of the first threaded zones and the height of the threads of the second threaded zones are each in the range 1 mm to 2.5 mm, and the angle of the load flanks of the first and second threaded zones with the normal to the axis of revolution is in the range 1 to 20 degrees, and the angle of the stabbing flanks of the first and second threaded zones with the normal to the axis of revolution is in the range 3 to 25 degrees.

16 Claims, 3 Drawing Sheets

(51) Int. Cl.
*E21B 17/042* (2006.01)
*F16L 15/00* (2006.01)

(58) Field of Classification Search
USPC .......................................... 285/333, 334, 390
See application file for complete search history.

(56) References Cited

U.S. PATENT DOCUMENTS

| | | |
|---|---|---|
| 4,696,498 A | 9/1987 | Church |
| 5,498,035 A | 3/1996 | Blose et al. |
| 6,705,648 B1 * | 3/2004 | Maruyama ............ E21B 17/042 |
| | | 285/333 |
| 6,767,035 B2 | 7/2004 | Hashem |
| 7,416,374 B2 | 8/2008 | Breihan et al. |
| 7,475,917 B2 | 1/2009 | Sivley, IV et al. |
| 2004/0183297 A1 | 9/2004 | Morotti et al. |
| 2008/0012321 A1 * | 1/2008 | Roussie ................ E21B 17/042 |
| | | 285/334 |
| 2017/0167642 A1 * | 6/2017 | Williamson .......... E21B 17/042 |

FOREIGN PATENT DOCUMENTS

| | | |
|---|---|---|
| CN | 201874485 U | 6/2011 |
| CN | 202380987 | 8/2012 |
| CN | 203257342 U | 10/2013 |
| SU | 1131481 A | 12/1984 |
| SU | 1575950 A3 | 6/1990 |
| WO | 2004/072533 A1 | 8/2004 |

* cited by examiner

ASSEMBLY FOR PRODUCING A THREADED CONNECTION FOR DRILLING AND OPERATING HYDROCARBON WELLS, AND RESULTING THREADED CONNECTION

FIELD OF THE INVENTION

The present invention relates to threaded connections for drilling and/or operating hydrocarbon wells, and more precisely to optimizing the overall performance of a connection in terms of the efficiency and seal when the connection works in tension-compression.

BACKGROUND OF THE INVENTION

The term "threaded connections" means any assembly constituted by substantially tubular elements, which are metallic and capable of being coupled together by makeup, in particular with a view to constituting either a stem for drilling a hydrocarbon well or a work-over riser or string for operating such wells, such as a riser, or a casing or tubing string used in operating a well.

Each tubular component comprises an end portion provided with a male threaded zone or a female threaded zone for making up with a corresponding end portion of an analogous element. When coupled, the elements make up what is known as a connection.

These threaded tubular components of a connection are coupled under predetermined loads in order to satisfy clamping and sealing requirements imposed by the service conditions. Further, it should be understood that the threaded tubular components may have to undergo several makeup-breakout cycles, in particular in service.

The conditions for use of such threaded tubular components give rise to a wide range of mechanical loads which act on the sensitive portions of these components, such as the threaded zones, abutting zones or sealing surfaces over wide ranges.

For this reason, connection design is a complex specification which demands taking several parameters into account at the same time. Thus, it is recommended that the efficiency of the connection and the thickness of the zone of the tubular components which bears the sealing surfaces be preserved and the risks of displacement of the sealing contact points be minimized as far as possible when the connection operates in tension and in compression.

U.S. Pat. No. 7,416,374 describes connections using two threadings in a double helix and in which the thread crests are rounded.

However, that type of solution only improves the fatigue performance. The principle of having two threaded zones in a double start configuration is only used with the aim of accelerating makeup and breakout.

Document U.S. Pat. No. 7,475,917 provides connections in which the angles of the stabbing flanks and the load flanks change along the whole length of the threading.

However, that type of solution, aimed at introducing point changes to the load flank or stabbing flank angles in the threading, can only be used to optimize the distribution of the load concentrations. That type of solution cannot be used to improve the tension/compression performances, to control the pressure of the makeup grease or to reduce the axial displacements which appear under alternating loads.

Document U.S. Pat. No. 6,767,035 is intended to generate a high makeup torque using a dovetail first threading and a positive angle second threading. An alternative described in FIG. 9 proposes the use of two threadings wherein the angles which the stabbing flanks form with the normal to the axis of the connection are equal and highly inclined.

However, those solutions cannot be used to provide good tensile strength and good compressive strength at the same time.

SUMMARY

For this reason, the aim of the invention is to provide threadings with at least two helices, or even with multi-helices, these threadings being different so as to add the qualities of each, such as the tensile strength, compressive strength or fatigue strength.

More precisely, the invention concerns an assembly for producing a threaded connection, comprising a first and a second tubular component with an axis of revolution and each respectively provided at one of their ends with at least a first and a second continuous threaded zone, respectively produced on the outer or inner circumferential surface of the component depending on whether the threaded end is male or female in type, in the form of a first and a second helix each provided with a first and a second taper generatrix, the first threaded zones produced in accordance with the first helix being capable of cooperating together in makeup and the second threaded zones produced in accordance with the second helix being capable of cooperating together in makeup, each of the threaded zones defining a thread profile, viewed in a longitudinal section passing through the axis of revolution, provided with load flanks, stabbing flanks, thread crests, and thread roots, characterized in that the height of the threads of the first threaded zones and the height of the threads of the second threaded zones are each in the range 1 mm to 2.5 mm, and the angle of the load flanks of the first and second threaded zones with the normal to the axis of revolution is in the range 1 to 20 degrees, and the angle of the stabbing flanks of the first and second threaded zones with the normal to the axis of revolution is in the range 3 to 25 degrees.

Optional features of the invention, which may be complementary or substitutional, are given below.

The difference between the thread height of the first threaded zones and the thread height of the second threaded zones may be greater than or equal to 0.05 mm as an absolute value.

The thread crests and roots of the first and second threaded zones may each form an angle with the axis of revolution in the range 0 to 10 degrees.

The thread crests and roots of the first and second threaded zones may form an identical angle with the axis of revolution.

The thread height of the first threaded zones and the thread height of the second threaded zones may be restricted to the range defined by the values 1.3 mm and 2 mm, and the angle of the load flanks of the first and second threaded zones with the normal to the axis of revolution may be restricted to the range defined by the values 3 and 15 degrees, and the angle of the stabbing flanks of the first and second threaded zones with the normal to the axis of revolution may be restricted to the range defined by the values 10 and 25 degrees.

The thread crests and roots of the first or the second threaded zones may be parallel to the axis of revolution, while the thread crests and roots of the second or the first threaded zones may be parallel to the taper generatrix of said threaded zone.

The angle of the stabbing flanks of the first threaded zones may differ from the angle of the stabbing flanks of the second threaded zones by at least 0.5 degrees as an absolute value.

The angle of the stabbing flanks of the first threaded zones may differ from the angle of the stabbing flanks of the second threaded zones by at least 5 degrees as an absolute value.

The taper generatrix of the first threaded zones may differ from the taper generatrix of the second threaded zones.

The taper generatrix of the first threaded zones may be equal to the taper generatrix of the second threaded zones.

There may be a clearance between the stabbing flanks of the first and second threaded zones.

The difference between the value of the clearance between the stabbing flanks of the first threaded zones and the value of the clearance between the stabbing flanks of the second threaded zones may be in the range 0.05 mm to 0.5 mm.

The ends of the first and second tubular components may each comprise at least one sealing surface which can cooperate in a sealed interference fit when the connection is in the made up condition.

The ends of the first and second tubular components may each comprise at least one abutment surface which is capable of cooperating in abutment when the connection is in the made up condition.

The invention also concerns a threaded connection resulting from making up an assembly.

BRIEF DESCRIPTION OF THE DRAWINGS

The features and advantages of the invention will now be disclosed in more detail in the description below, made with reference to the accompanying drawings.

DETAILED DESCRIPTION

Figure 1:
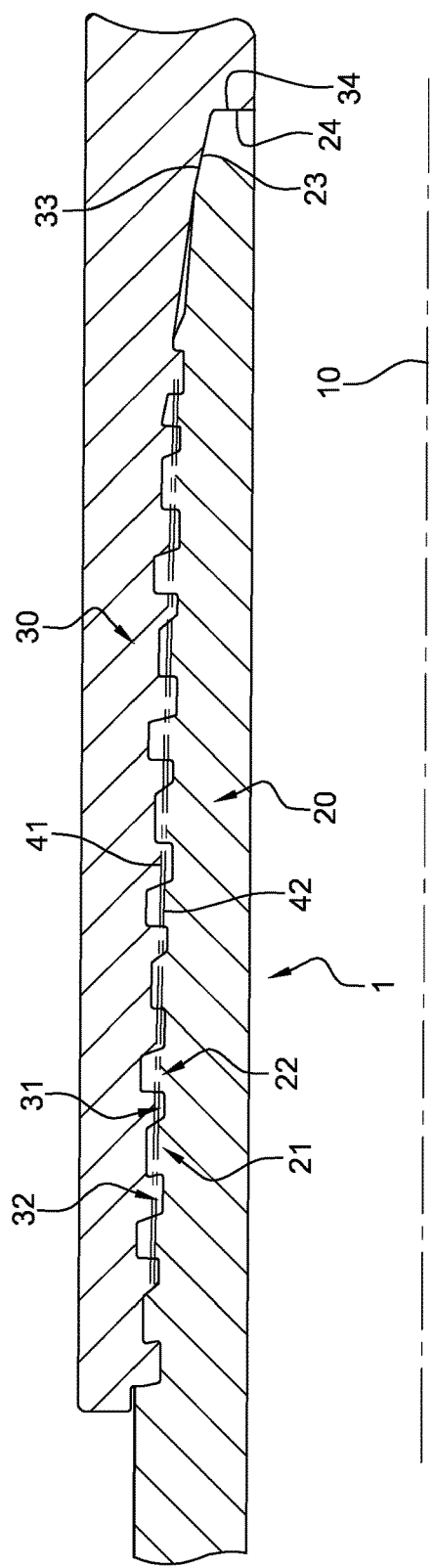
FIG. 1 is a diagrammatic view in longitudinal section of a connection resulting from coupling two tubular components by makeup, and is in accordance with one embodiment of the invention.

FIG. 1 shows an assembly for producing a threaded connection, comprising a first and a second tubular metallic component, generally formed from steel, with an axis of revolution 10 and each provided with an end 20, 30.

The end 20, known as male, comprises a first 21 and a second 22 continuous threaded zone produced on the outer circumferential surface of the end of one of the tubular components.

The first and the second threaded zone 21 and 22 are each respectively produced in accordance with a first and a second helix each provided with a first taper generatrix 41 and a second taper generatrix 42. The first 21 and the second 22 continuous threaded zones are alternated, i.e. two consecutive pitches of one of the first 21 or second 22 threaded zones are separated by a thread pitch from the other alternative first 21 or second 22 threaded zones. The threaded zones are intertwined.

The end 30, known as female, comprises a first 31 and a second 32 continuous threaded zone, produced on the inner circumferential surface of the end of the other tubular component. The first and the second threaded zones 31 and 32 are each respectively produced in accordance with a first and a second helix each provided with a first taper generatrix 41 and a second taper generatrix 42. The first 31 and the second 32 continuous threaded zones are alternated, i.e. two consecutive pitches of one of the first 31 or second 32 threaded zones are separated by a thread pitch from the other alternative first 31 or second 32 threaded zones. The threaded zones are intertwined.

Clearly, the threaded zones may be continuous, or indeed they may be interrupted.

The first threaded zones 21, 31 of the first end 20 and the second end 30 have the same taper generatrix 41 and are capable of cooperating together in makeup. Similarly, the second threaded zones 22, 32 of the first end 20 and the second end 30 have the same taper generatrix 42 and are capable of cooperating together in makeup.

Each of the threaded zones 21, 22, 31, 32 defines a thread profile, viewed in a longitudinal section passing through the axis of revolution 10, respectively provided with load flanks 21*a*, 22*a*, 31*a*, 32*a*, stabbing flanks 21*b*, 22*b*, 31*b*, 32*b*, thread crests 21*c*, 22*c*, 31*c*, 32*c*, and thread roots 21*d*, 22*d*, 31*d*, 32*d*.

In order to be able to screw the first component into the second component, the pitch of the first threaded zones 21 and 31 is identical to the pitch of the second threaded zones 22 and 32.

In accordance with the invention, the height TH of the threads of the first threaded zones 21, 31 and the height TH2 of the threads of the second threaded zones 22, 32 are each in the range 1 mm to 2.5 mm.

In accordance with the invention, the angle of the load flanks LFA1, LFA2 of the first and second threaded zones with the normal to the axis of revolution 10 is in the range 1 to 20 degrees.

In accordance with the invention, the angle of the stabbing flanks SFA1, SFA2 of the first and second threaded zones with the normal to the axis of revolution 10 is in the range 3 to 25 degrees.

Clearly, the value and sign of the angles are defined with respect to the normal to the axis 10 of the connection and counter-clockwise.

Figure 3:
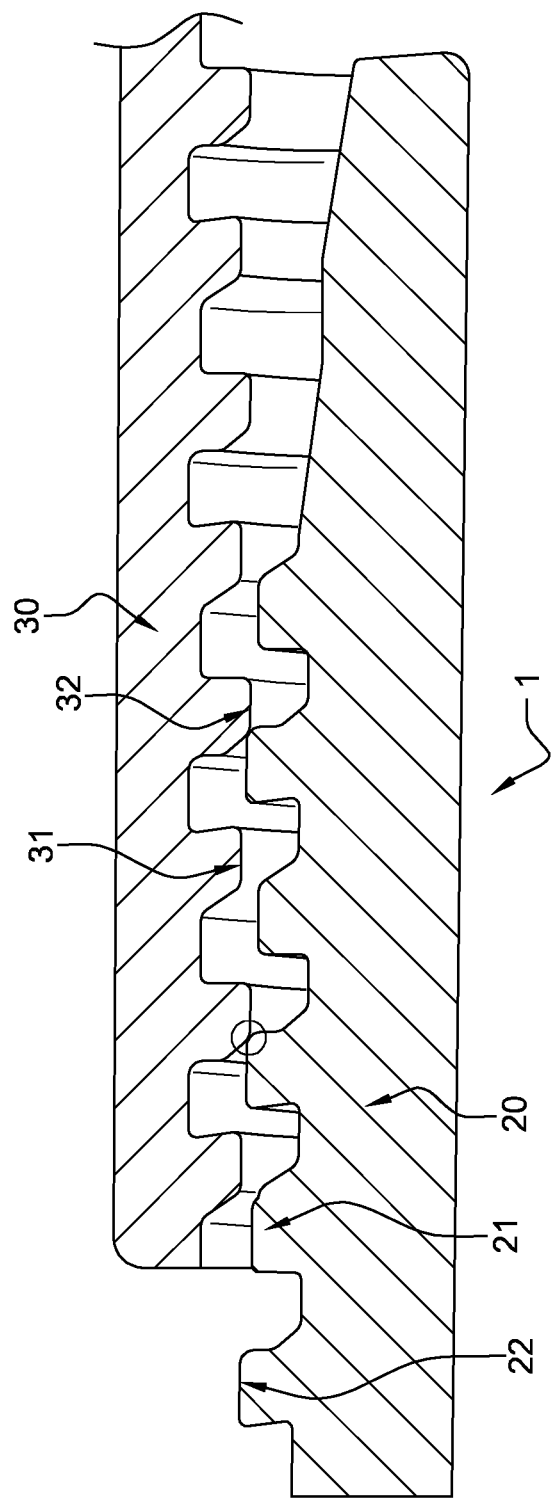
FIG. 3 is an exploded perspective view of two components which are to be assembled.

Preferably, the difference between the height TH1 of the threads of the first threaded zones 21, 31 and the height TH2 of the threads of the second threaded zones 22, 32 is greater than or equal to 0.05 mm as an absolute value. For this reason, there is no risk of catching between the teeth of the threadings of the male and female components. In fact, as can be seen at the small circle of FIG. 3, during makeup, this means that the crests of the threads of the threaded zones of the male end avoid catching the thread crests of the threaded zones of the female end. Similarly, this difference in the tooth height acts as a kind of idiot-proofing means to allow for correct makeup of the first threaded zones 21, 31 as a whole and the second threaded zones 22, 32 as a whole.

In one embodiment, the thread crests and roots of the first 21, 31 and the second threaded zones 22, 32 each form an angle in the range 0 to 10 degrees with the axis of revolution 10. Thus, the surface of the stabbing flanks is not too reduced and means that good behaviour in compression is preserved, while keeping the correct stabbing properties between the female and male ends upon makeup.

In a particular case, the angle which the thread crests and roots of the first 21, 31 and the second 22, 32 threaded zones form with the axis of revolution 10 is the same for the first 21, 31 and the second 22, 32 threaded zones. Thus, it is easier to control the thread diameter of each of the threaded zones with the same tool.

In a preferred embodiment, the height TH1 of the threads of the first threaded zones 21, 31 and the height TH2 of the threads of the second threaded zones 22, 32 are each in the range 1.3 mm to 2 mm. At the same time, the angle of the load flanks of the first and second threaded zones with the normal to the axis of revolution 10 is in the range 3 to 15 degrees, and the angle of the stabbing flanks of the first and second threaded zones with the normal to the axis of revolution 10 is in the range 10 to 25 degrees.

Again, at the same time and in the context of the preferred embodiment described above, the crests and the roots of the threads of the first threaded zones 21, 31 are parallel to the axis of revolution 10, while the crests and the roots of the threads of the second threaded zones 22, 32 are parallel to the taper generatrix 42 of the threaded zones 22, 32. Thus, makeup can be carried out more easily, avoiding the risk of crossing the threaded zones during the stabbing operation between the male and female ends, providing for a type of idiot-proofing means.

This means that during makeup, the threaded zone 21 is correctly screwed into the threaded zone 31 and not the threaded zone 32, and the threaded zone 22 is correctly screwed into the threaded zone 32 and not the threaded zone 31.

In a variation of the preferred embodiment described above, the thread crests and roots of the second threaded zones 22, 32 are parallel to the axis of revolution 10, while the thread crests and roots of the first threaded zones 21, 31 are parallel to the taper generatrix 41 of the threaded zones 21, 31. Thus, makeup can be carried out more easily, avoiding the risk of crossing threaded zones during the stabbing operation between the female and male ends, providing a kind of idiot-proofing means.

Advantageously, the angle of the stabbing flanks SFA1 of the first threaded zones is different from the angle of the stabbing flanks SFA2 of the second threaded zones by at least 0.5 degrees as an absolute value. Thus, this means that one of the threaded zones is provided with a higher compressive strength. This feature can also be accentuated by bringing the difference between the angle of the stabbing flanks of the first threaded zones and the angle of the stabbing flanks of the second threaded zones to 5 degrees.

In one embodiment, the taper generatrix 41 of the first threaded zones 21, 31 is different from the taper generatrix 42 of the second threaded zones 22, 32. This configuration can be used to obtain a supplemental idiot-proofing means. Henceforth, two consecutive crests 21 or 31 of the first threaded zone having a taper generatrix 41 are separated by, at least, one crest 22 or 32 of the second threaded zone having a different taper generatrix 42.

Alternatively, the taper generatrix 41 of the first threaded zones 21, 31 is equal to the taper generatrix 42 of the second threaded zones 22, 32. This configuration can facilitate machining.

Figure 2:
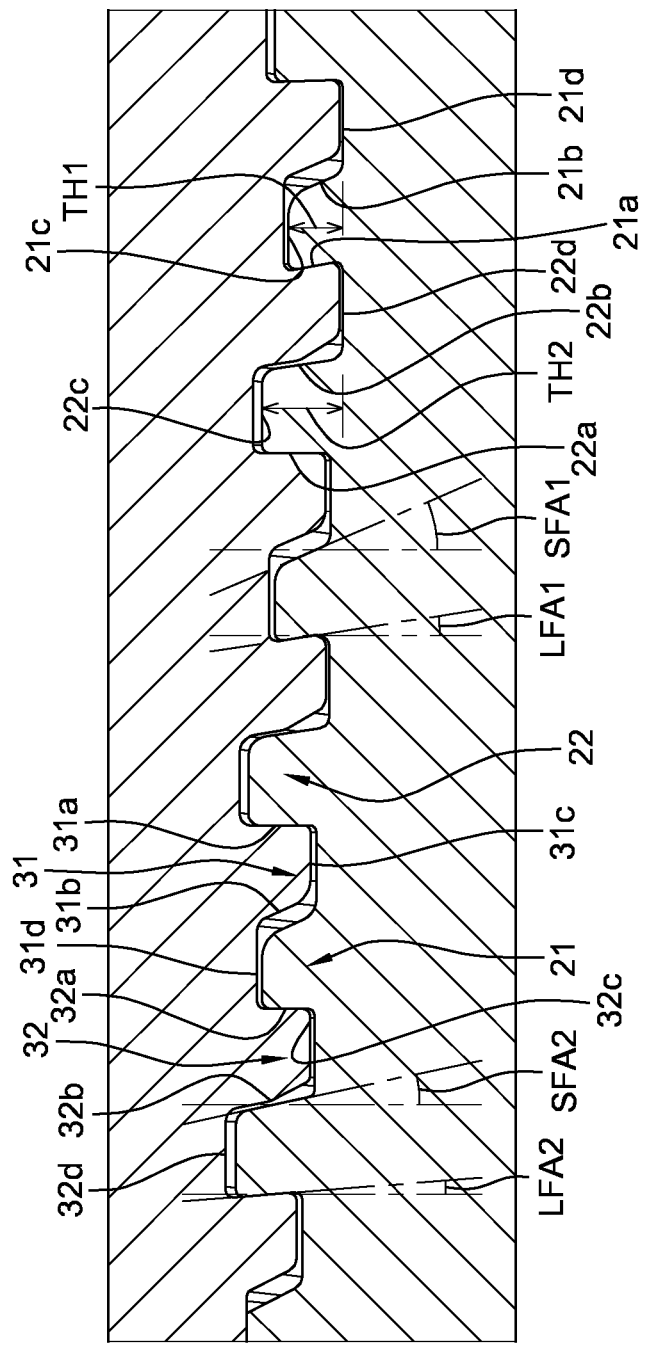
FIG. 2 is a detailed diagrammatic view in longitudinal section of threadings coupled by making up two tubular components and is in accordance with an embodiment of the invention.

Advantageously and as can be seen in FIG. 2, it may be desirable to provide a clearance between the stabbing flanks 21b, 31b of the first threaded zones 21, 31 and between the stabbing flanks 22b, 32b of the second threaded zones 22, 32 when the connection is made up. In fact, these clearances constitute free volumes which collect makeup grease, thereby preventing overpressure problems which result in disengagement of the threads during makeup. Thus, it is of interest to provide one of the threaded zones with a clearance which is smaller such that this threaded zone has good compressive strength, and to provide the other threaded zone with a high clearance so that the other threaded zone collects makeup grease. Preferably, the difference between the value of the clearance between the stabbing flanks of the first threaded zones 21, 31 and the value of the clearance between the stabbing flanks of the second threaded zones 22, 32 is in the range 0.05 mm to 0.5 mm.

Optionally, the ends 20, 30 of the first and second tubular components each comprise at least one sealing surface 23, 33 which can cooperate as an interference fit when the connection is made up.

It is necessary to guarantee an enhanced level of sealing corresponding to high pressures at the connection between two components. To this end, it is known on other types of connections, such as VAM® TOP connections described in the Applicant's catalogue No 940, to provide, on the male end of the connection beyond the threaded zone, a sealing surface intended to cooperate as an interference fit with a sealing surface provided on the female end of the connection.

It should be noted that the sealing surfaces 23 and 33 of the male and female ends may be disposed close to the terminal surface of the male end, or indeed close to the terminal surface of the female end.

One of the sealing surfaces may have a domed surface which is turned radially outwardly, with a diameter which decreases towards the terminal surface under consideration. The radius of this domed surface is preferably in the range 30 to 100 mm. Too large a radius (>150 mm) of the domed surface causes problems identical to those of a cone on cone contact. Too small a radius (<30 mm) of this domed surface causes an insufficient contact width.

Facing this domed surface, the female end has a tapered surface which is turned radially inwardly, with a diameter which also decreases in the direction of the terminal surface of the male end. The tangent to the peak half angle of the tapered surface is in the range 0.025 to 0.075, i.e. a taper in the range 5% to 15%. Too low a taper (<5%) for the tapered surface causes a risk of galling on makeup, and too high a taper (>15%) necessitates very tight machining tolerances.

It has in fact been shown that such a contact zone between a tapered surface and a domed surface can be used to obtain a high effective axial contact width and a substantially semi-elliptic distribution of contact pressures along the effective contact zone, in contrast to contact zones between two tapered surfaces which have two narrow effective contact zones at the ends of the contact zone.

Optionally, the ends 20, 30 of the first and second tubular components each comprise at least one abutment surface 24, 34 which is capable of cooperating in abutment when the connection is in the made up condition. These abutment surfaces may form an internal abutment, as can be seen in FIG. 1, i.e. the abutment surface 24 is disposed at the free end of the male component, this free end extending along a generally radial surface with respect to the axis 10 of the connection. The abutment surface 34 is disposed facing the abutment surface 24 and at a shoulder of the female component.

The abutment surfaces may have a tapered shape, as in the document EP 0 488 912, toroidal as in the document U.S. Pat. No. 3,870,351 or WO 2007/017082, stepped as in the document U.S. Pat. No. 4,611,838, protruding as in the document U.S. Pat. No. 6,047,797 or a combination of these shapes.

Advantageously, the tapered form with an angle in the range −20 to −5 degrees is preferred, this angle being the angle formed by the abutment surface with the normal to the axis 10 of the connection.

The invention also concerns a threaded connection resulting from making up an assembly The invention can be applied to any type of connection, whether of the coupled, flush or semi-flush type.

The invention claimed is:

1. An assembly for producing a threaded connection, comprising a first and a second tubular component with an axis of revolution and each respectively provided at one of their ends with first threaded zones and second threaded zones, respectively produced on an outer or inner circumferential surface of the component depending on whether a threaded end is male or female in type, in the form of a first and a second helix each provided with a first and a second taper generatrix, the first threaded zones produced in accordance with the first helix to cooperate together in makeup and the second threaded zones produced in accordance with the second helix to cooperate together in makeup, each of the threaded zones defining a thread profile, viewed in a longitudinal section passing through the axis of revolution, provided with load flanks, stabbing flanks, thread crests, and thread roots, wherein:
  a thread height of threads of the first threaded zones and a thread height of threads of the second threaded zones are each in the range 1 mm to 2.5 mm,
  an angle of the load flanks of the first and second threaded zones with a normal to the axis of revolution is in the range 1 to 20 degrees,
  an angle of the stabbing flanks of the first and second threaded zones with the normal to the axis of revolution is in the range 3 to 25 degrees, and
  the angle of the stabbing flanks of the first threaded zones differ from the angle of the stabbing flanks of the second threaded zones by at least 0.5 degree as an absolute value.

2. An assembly for producing a threaded connection according to claim 1, wherein a difference between the thread height of the first threaded zones and the thread height of the second threaded zones is greater than or equal to 0.05 mm as an absolute value.

3. An assembly for producing a threaded connection according to claim 1, wherein the thread crests and roots of the first and/or the second threaded zones each form an angle with the axis of revolution in the range 0 to 10 degrees.

4. An assembly for producing a threaded connection according to claim 3, wherein the thread crests and roots of the first and second threaded zones do not form the same angle with the axis of revolution.

5. An assembly for producing a threaded connection according to claim 1, wherein:
  the thread height of the first threaded zones and the thread height of the second threaded zones are each in the range 1.3 mm to 2 mm,
  the angle of the load flanks of the first and second threaded zones with the normal to the axis of revolution is in the range 3 to 15 degrees, and
  the angle of the stabbing flanks of the first and second threaded zones with the normal to the axis of revolution is in the range 10 to 25 degrees.

6. An assembly for producing a threaded connection according to claim 5, wherein the thread crests and roots of the first or the second threaded zones are parallel to the axis of revolution, while the thread crests and roots of the second or the first threaded zones are parallel to the taper generatrix of said threaded zone.

7. An assembly for producing a threaded connection according to claim 1, wherein the taper generatrix of the first threaded zones differ from the taper generatrix of the second threaded zones.

8. An assembly for producing a threaded connection according to claim 1, wherein the taper generatrix of the first threaded zones is equal to the taper generatrix of the second threaded zones.

9. An assembly for producing a threaded connection according to claim 1, wherein the angle of the stabbing flanks of the first threaded zones differ from the angle of the stabbing flanks of the second threaded zones by at least 5 degrees as an absolute value.

10. An assembly for producing a threaded connection according to claim 1, wherein a clearance is provided between the stabbing flanks of the first and second threaded zones when the connection is made up.

11. An assembly for producing a threaded connection according to claim 10, wherein the difference between a value of the clearance between the stabbing flanks of the first threaded zones and a value of the clearance between the stabbing flanks of the second threaded zones is in the range 0.05 mm to 0.5 mm.

12. An assembly for producing a threaded connection according to claim 1, wherein the ends of the first and second tubular components each comprise at least one sealing surface which can cooperate in a sealed interference fit when the connection is in a made up condition.

13. An assembly for producing a threaded connection according to claim 1, wherein the ends of the first and second tubular components each comprise at least one abutment surface which is configured to cooperate in abutment when the connection is in a made up condition.

14. A threaded connection resulting from making up an assembly in accordance with claim 1.

15. An assembly for producing a threaded connection, comprising a first and a second tubular component with an axis of revolution and each respectively provided at one of their ends with first threaded zones and second threaded zones, respectively produced on an outer or inner circumferential surface of the component depending on whether a threaded end is male or female in type, in the form of a first and a second helix each provided with a first and a second taper generatrix, the first threaded zones produced in accordance with the first helix to cooperate together in makeup and the second threaded zones produced in accordance with the second helix to cooperate together in makeup, each of the threaded zones defining a thread profile, viewed in a longitudinal section passing through the axis of revolution, provided with load flanks, stabbing flanks, thread crests, and thread roots, wherein:
  a thread height of threads of the first threaded zones and a thread height of threads of the second threaded zones are each in the range 1 mm to 2.5 mm,
  an angle of the load flanks of the first and second threaded zones with a normal to the axis of revolution is in the range 1 to 20 degrees,
  an angle of the stabbing flanks of the first and second threaded zones with the normal to the axis of revolution is in the range 3 to 25 degrees, and
  a clearance is provided between the stabbing flanks of the first and second threaded zones when the connection is made up.

16. An assembly for producing a threaded connection, comprising a first and a second tubular component with an axis of revolution and each respectively provided at one of their ends with first threaded zones and second threaded zones, respectively produced on an outer or inner circumferential surface of the component depending on whether a threaded end is male or female in type, in the form of a first and a second helix each provided with a first and a second taper generatrix, the first threaded zones produced in accordance with the first helix to cooperate together in makeup and the second threaded zones produced in accordance with the second helix to cooperate together in makeup, each of the threaded zones defining a thread profile, viewed in a longitudinal section passing through the axis of revolution, provided with load flanks, stabbing flanks, thread crests, and thread roots, wherein:

- a thread height of threads of the first threaded zones and a thread height of threads of the second threaded zones are each in the range 1 mm to 2.5 mm,
- an angle of the load flanks of the first and second threaded zones with a normal to the axis of revolution is in the range 1 to 20 degrees,
- an angle of the stabbing flanks of the first and second threaded zones with the normal to the axis of revolution is in the range 3 to 25 degrees, and
- wherein the ends of the first and second tubular components each comprise at least one sealing surface which can cooperate in a sealed interference fit when the connection is in a made up condition.

* * * * *

UNITED STATES PATENT AND TRADEMARK OFFICE
CERTIFICATE OF CORRECTION

PATENT NO. : 10,119,637 B2
APPLICATION NO. : 15/102695
DATED : November 6, 2018
INVENTOR(S) : Pierre Martin et al.

Page 1 of 1

It is certified that error appears in the above-identified patent and that said Letters Patent is hereby corrected as shown below:

In the Specification

Column 4, Line 30, change "the height TH of" to --the height TH1 of--; and

Column 7, Line 6, change "an assembly" to --an assembly.--.

Signed and Sealed this
Seventh Day of January, 2020

Andrei Iancu
*Director of the United States Patent and Trademark Office*